United States Patent
Smith

(10) Patent No.: US 10,773,896 B1
(45) Date of Patent: Sep. 15, 2020

(54) CONVEYOR APPARATUS AND SYSTEM

(71) Applicant: Safari Belting Systems, Inc., Olathe, KS (US)

(72) Inventor: Chris Smith, Olathe, KS (US)

(73) Assignee: SAFARI BELTING SYSTEMS, INC., Olathe, KS (US)

( * ) Notice: Subject to any disclaimer, the term of this patent is extended or adjusted under 35 U.S.C. 154(b) by 0 days.

(21) Appl. No.: 16/443,706

(22) Filed: Jun. 17, 2019

(51) Int. Cl.
| | |
|---|---|
| *B65G 39/20* | (2006.01) |
| *B65G 17/08* | (2006.01) |
| *B65G 17/24* | (2006.01) |
| *B65G 39/02* | (2006.01) |
| *B65G 17/34* | (2006.01) |

(52) U.S. Cl.
CPC ............ *B65G 39/20* (2013.01); *B65G 17/08* (2013.01); *B65G 17/24* (2013.01); *B65G 17/345* (2013.01); *B65G 39/02* (2013.01); *B65G 2207/30* (2013.01)

(58) Field of Classification Search
None
See application file for complete search history.

(56) References Cited

U.S. PATENT DOCUMENTS

| | | | | |
|---|---|---|---|---|
| 5,123,524 A | * | 6/1992 | Lapeyre | B65G 17/08 198/853 |
| 6,997,306 B2 | * | 2/2006 | Sofranec | B65G 39/20 198/779 |
| 7,971,706 B2 | * | 7/2011 | Ozaki | B65G 23/20 198/835 |
| 9,004,200 B2 | * | 4/2015 | Ben-Tzvi | B62D 55/02 180/6.7 |

\* cited by examiner

*Primary Examiner* — Kavel Singh
(74) *Attorney, Agent, or Firm* — John G. Fischer, Esq.; Scheef & Stone, L.L.P.

(57) ABSTRACT

A conveyor system is provided. Conveyor modules are pivotally secured to one another through engagement of links on a first and second side of each module. Portals extend through the modules. Each portal comprises four portal surfaces oriented in opposing pairs. A radial slot is located on each of at least two portal surfaces. A cup is provided with four walls. Ridges are formed on the outside surfaces of at least two opposing walls of the cup. An orifice is formed on two opposing walls of the cup. A roller is rotatably mounted on an axle that extends between the orifices to position the roller inside the cup. The cup is secured inside the portal by engagement of the ridges with the slots. The cup and roller assembly may be rotated to change its orientation relative to the module.

13 Claims, 19 Drawing Sheets

CONVEYOR APPARATUS AND SYSTEM

TECHNICAL FIELD OF THE INVENTION

The invention relates generally to a conveyor system, and, more particularly, to a conveyor system for box and package transportation.

BACKGROUND OF THE INVENTION

In the meat and meat packing industries, cleanliness is paramount to the entire operation. Meat and meat byproducts, by their very nature, carry bacteria. These bacteria can, however, be harmful to humans and/or animals that eventually consume the meat or meat products. As it is very difficult to eliminate all of the bacteria during processing, measures are taken in order to control bacterial populations within the meat and meat products.

One way to assist in controlling the bacterial growth is to employ robust conveyor systems that are easy to clean. Conveyor belts and conveyor systems, however, are not altogether new, but instead, are frequently utilized today to transport meat. This means that these belts are almost constantly in contact with meat and meat byproducts. These conveyor systems typically have problems with bacterial growth because of the existence of crevices that are difficult to clean. Because of the frequency of use, it is desirable to have a conveyor system that reduces the ability for bacteria to grow, namely, by reducing the number of crevices or areas that are difficult to clean.

The most frequently employed conveyor systems comprise a number of interlocking conveyor modules linked together to form a conveyor belt, which is driven by a sprocket. More recently, it has been determined to be desirable to have the ability to replace rollers on such conveyers. Some examples of these types of conveyor systems are U.S. Pat. Nos. 6,148,990, 6,997,306, 7,364,038, and 7,419,052.

However, all of these designs require forming an element of the roller and axle holding system on the module itself, limiting the operator's flexibility as to the type and orientation of the roller installed on the module, and coincidentally limiting the application of the module. Additionally, direct engagement of the module with the rotating axle or roller itself results in premature wear of the entire module. This problem is exacerbated by the material requirements of the module surface dictating the material constraint of the wear surface engaging rotating axles and rollers. Further, these are generally directed to ball rollers which provide only a point contact for support of the load carried, as opposed to the line contact of a roller. They further fail to control the directional movement of the load.

Therefore, there is a need for a conveyor system that addresses at least some of the limitations associated with the conventional systems. In particular, a conveyor system is needed that is easy to clean, which reduces the number of crevices where bacterial growth can occur unchecked. Additionally, a conveyor system is needed that is flexible in its orientation of rollers and extension of rollers to permit efficient and affordable reconfiguration for different applications, and maintenance. It is further desirable to provide a system that has replaceable wear components.

SUMMARY OF THE INVENTION

Advantages of the various embodiments of the present invention are that it is simple, safe, and durable. Another advantage of the various embodiments of the present invention is that it is inexpensive to manufacture. Another advantage of the present invention is that it provides for a simplified, easily deployable, and easily removable system. Other advantages of the various embodiments of the present invention are that it is easy to clean and provides improved tracking.

In accordance with a first embodiment of the invention, a conveyor module is provided. Conveyor modules are pivotally secured to one another. Each conveyor module includes a planar member having a first side, an opposing second side, a first end and opposing second end, and a top surface and opposing bottom surface extending between the first and second sides and ends.

First links are located along the first side, and second links are located along the second side. The second links are adapted to engage and register with the first links to form a pivot joint between adjacent conveyor modules.

Portals extend through the top surface and the bottom surface of the planar member. Each portal has four surfaces formed in two opposing pairs. A radial slot is located on each of at least two portal surfaces.

A cup is provided, comprising four opposing walls. Each wall has an inside surface and an outside surface. A pair of opposing ridges is formed on the outside surfaces of at least two of the opposing walls.

A pair of opposing orifices is formed on the inside surfaces of at least two opposing walls of the cup. A roller is rotatably mounted on an axle. The axle extends between the orifices to position the roller inside the cup. The cup is secured inside the portal by engagement of the ridges with the slots.

In one embodiment of the invention, the surfaces of the portals and walls of the cups are tapered. In a second embodiment of the invention, the surfaces of the portals and walls of the cups are substantially vertical.

In a third embodiment of the invention, the portals extend through the top surface of the module but not through the bottom surface of the module. In this embodiment, the roller extends above the cup, but not below the cup.

In a fourth embodiment of the invention, each inside surface of the cup has a chamfered portion, inclining the interior of the cup inwards.

In a fifth embodiment of the invention, each inside surface of the cup has a chamfered portion, inclining the interior of the cup inwards. Also in this embodiment, the roller extends above the cup, but not below the cup.

In a sixth embodiment of the invention, the portals surfaces are oriented at substantially 45 degrees to the sides and ends of the module.

In a seventh embodiment of the invention, each portal comprises 16 portal surfaces oriented in eight opposing pairs in an eight-pointed star configuration. Each portal receives a cubic shaped cup in a multiple of eight positions, to provide four unique roller directions.

In an eighth embodiment the invention, each portal comprises 8 portal surfaces oriented in opposing pairs in an octagonal configuration. Each portal may receive a four-sided or eight-sided cup and roller assembly, to provide four unique roller directions.

Certain features of the embodiments disclosed can be readily combined with, or substituted for, the similar features disclosed in other embodiments. It should also be realized by those skilled in the art that such combinations do not depart from the spirit and scope of the invention as set forth in the appended claims.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
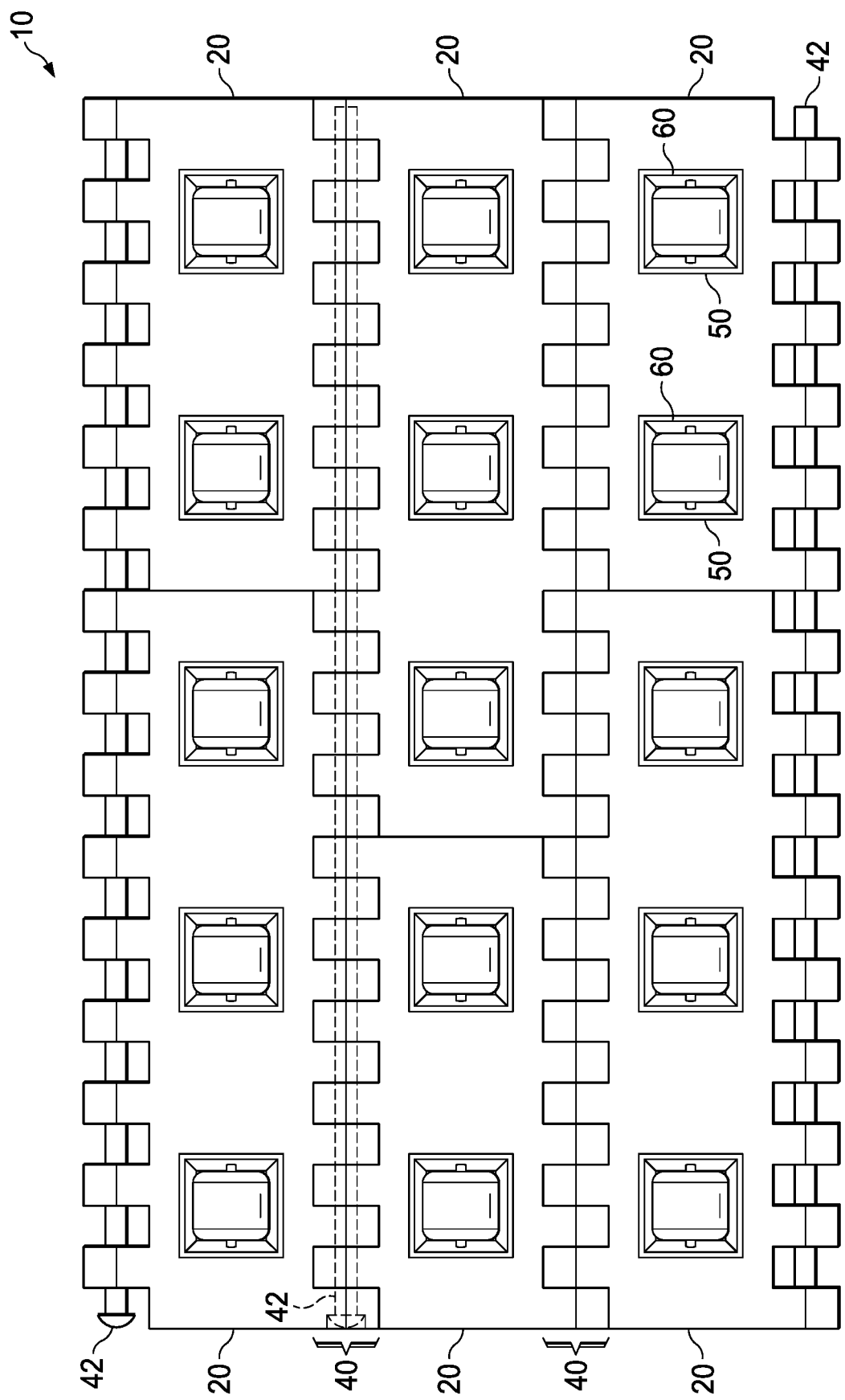
FIG. 1 is a top view of a conveyor system having multiple modules of a first embodiment of the invention connected together.

FIGS. 1-6 illustrate a first embodiment of the invention. FIG. 1 is a top view of a conveyor system 10 having multiple modules 20 of the first embodiment of the invention connected together. Modules 20 have portals 50 in which are mounted cup and roller assemblies 60.

Figure 2:
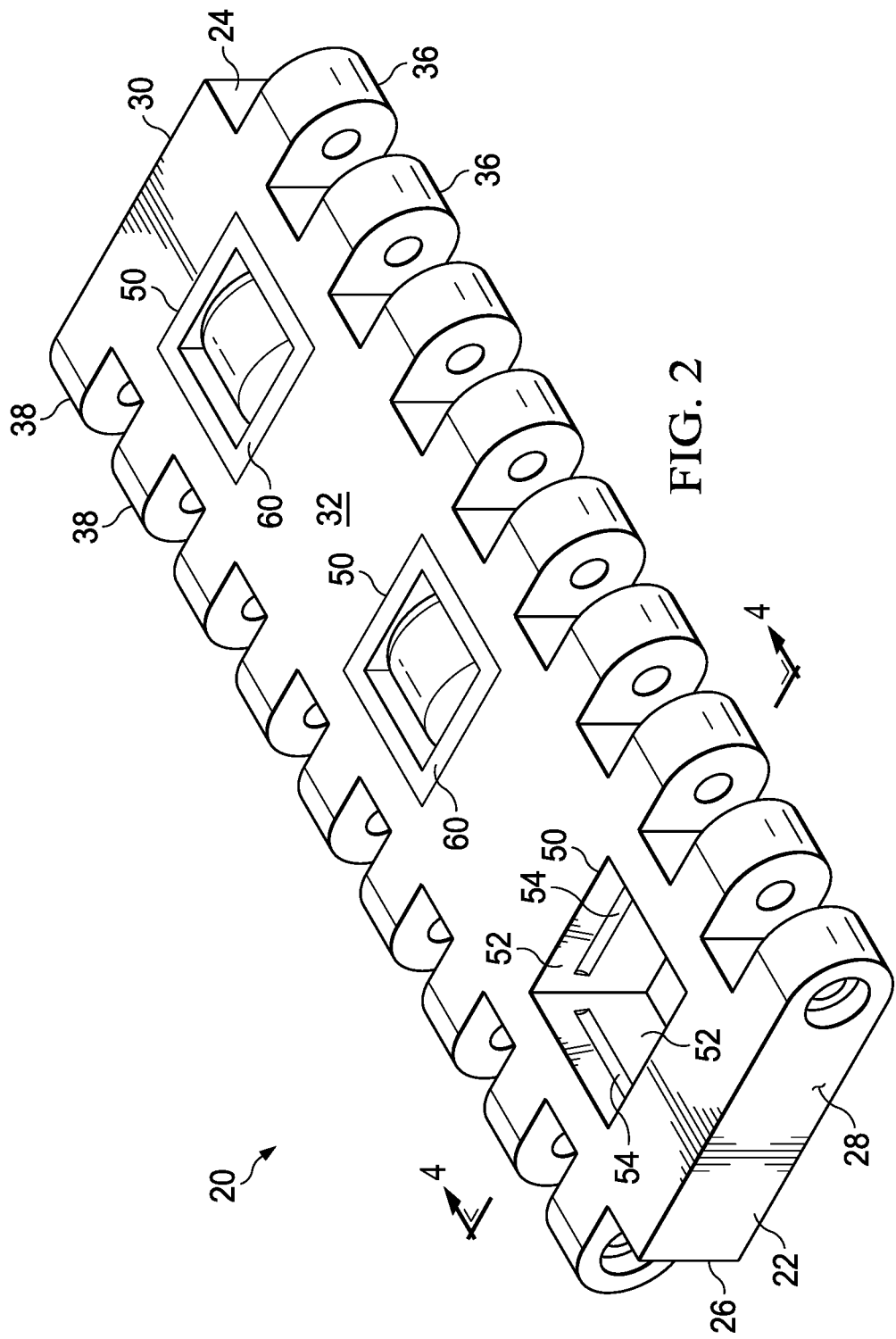
FIG. 2 is an isometric top view of a single conveyor module of the embodiment of FIG. 1, illustrating the module having an empty portal.

FIG. 2 is an isometric top view of a single conveyor module 20 of conveyor system 10. As seen in FIG. 2, conveyor module 20 comprises a planar member 22 having a first side 24, and opposite second side 26. Module 20 has a first end 28 and an opposite second end 30. A top surface 32 is formed on module 20 between first and second sides 24 and 26 and first and second ends 28 and 30. A bottom surface 34 (not shown) is formed on module 20 opposite top surface 32.

Figure 12:
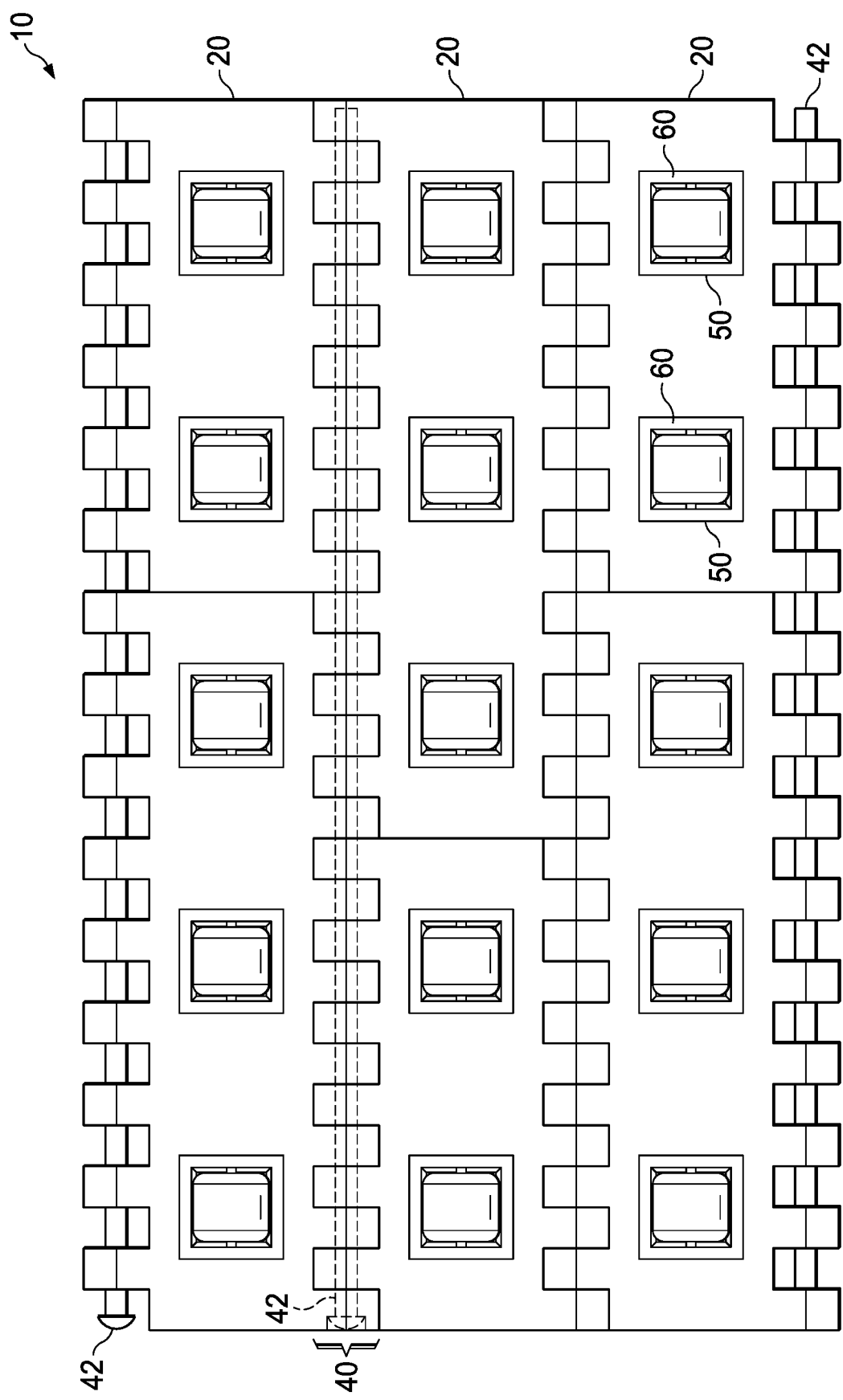
FIG. 12 is a top view of a conveyor system having multiple modules of a fourth embodiment of the invention connected together.
Figure 18:
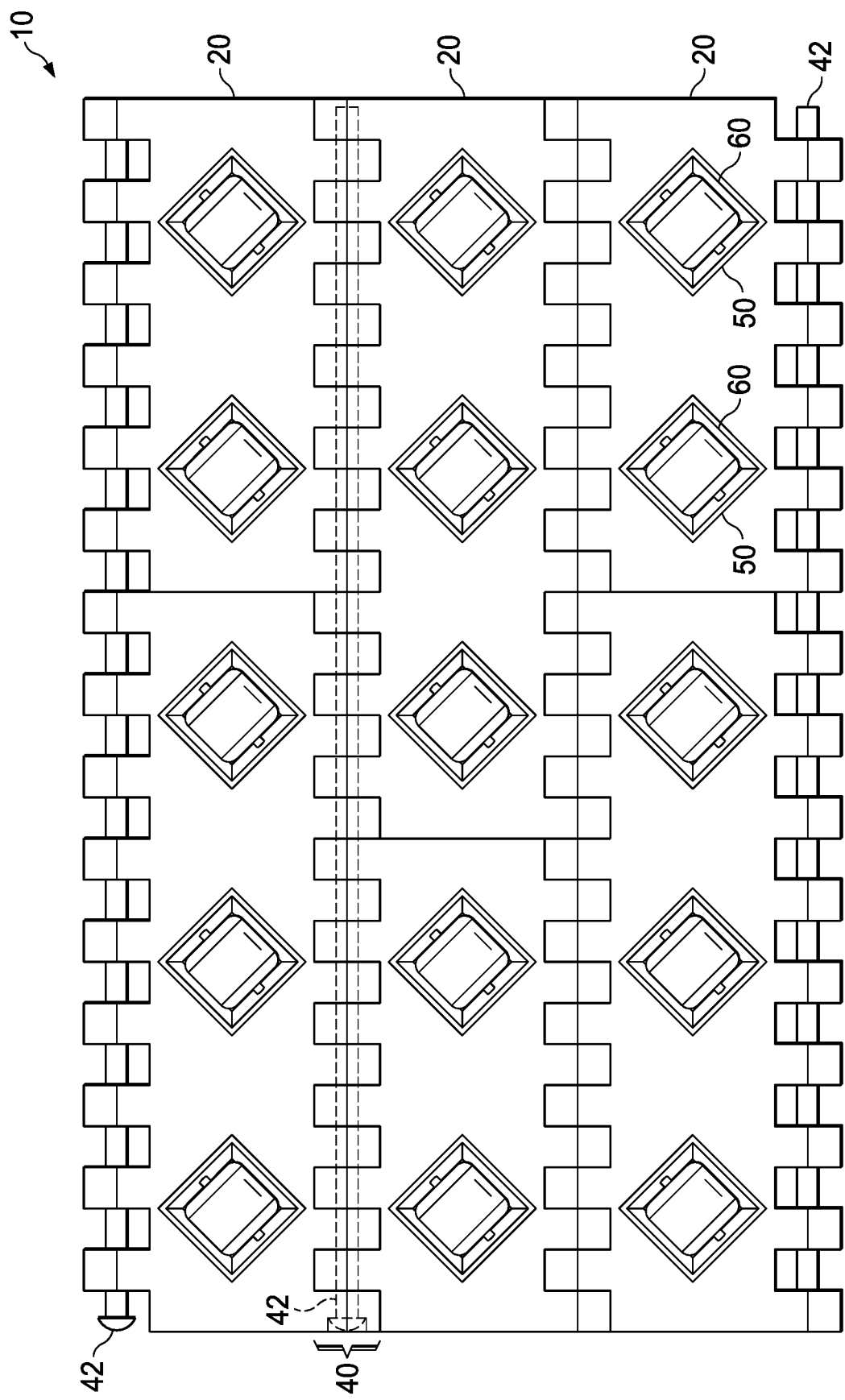
FIG. 18 is a top view of a conveyor system having multiple modules of a sixth embodiment of the invention connected together.

First links 36 are formed along first side 24. Second links 38 are formed along second side 26. First links 36 and second links 38 are designed to register and engage with each other and to form a pivot joint 40. As best seen in FIG. 1, a pivot bar 42 may be inserted thorough first links 36 and second links 38 at pivot joint 40 to secure adjacent modules 20 together in pivotal relation. In this manner, conveyor system 10 comprises a continuous conveyor of connected modules 20 as shown in FIGS. 1, 12, and 18.

As seen in FIG. 2, portals 50 are provided on module 20. In this view, cup and roller assemblies 60 are shown located in two of the three portals 50 of module 20. In the first embodiment illustrated in FIG. 2, portals 50 extend through top surface 32 and bottom surface 34 of planar member 22 of module 20. Also in this first embodiment, portal 50 comprises four portal surfaces 52 oriented in a rectangular formation of two opposing pairs. Portal surfaces 52 may be perpendicular in relation to top surface 32, or they may be formed in angular relation to top surface 32. A radial slot 54 is located on at least each of two of portal surfaces 52.

Figure 3:
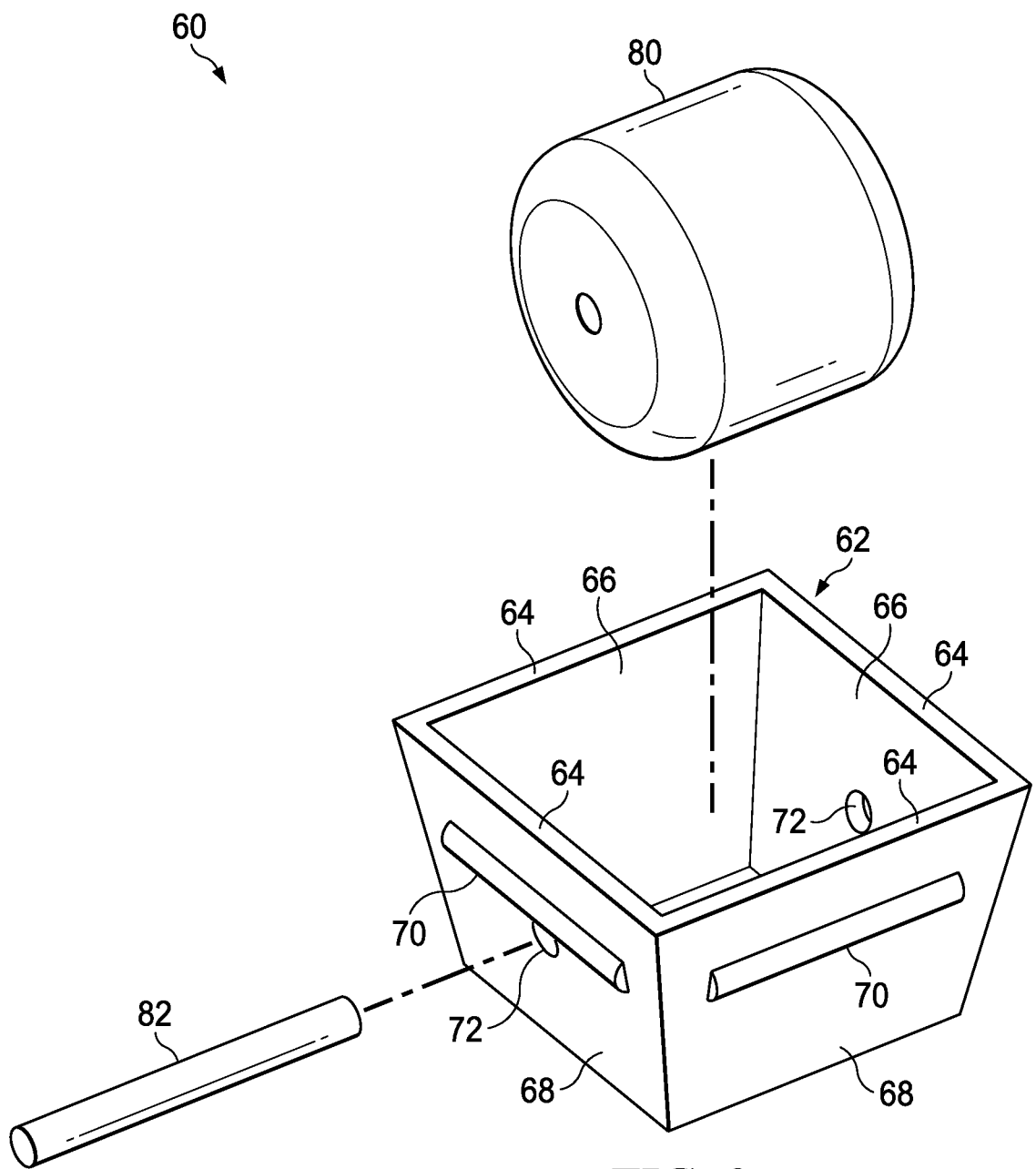
FIG. 3 is an isometric exploded view of a cup, roller, and axle assembly in accordance with the embodiment of FIG. 1.

FIG. 3 is an isometric exploded view of cup and roller assembly 60 in accordance with the embodiment of FIGS. 1 and 2. As seen in FIG. 3, cup 62 is comprised of four cup walls 64 oriented in a rectangular formation of two opposing pairs. Each wall 64 has an inside surface 66 and an outside surface 68. Outside surfaces 68 are shaped for complementary fit with portal surfaces 52 of portals 50 in modules 20.

A pair of ridges 70 is formed on outside surfaces 68 of at least two cup walls 64. A pair of opposing bearing orifices 72 is formed on two opposing cup walls 64. A roller 80 is mounted on an axle 82. Axle 82 is positioned to extend between bearing orifices 72 to position roller 80 inside cup 62. In a variation of this embodiment that is applicable to this and other embodiments, orifices 72 are located on interior surfaces 66 of cup walls 64, and do not extend to outside surfaces 68 of cup walls 64. More advantageously, one orifice 72 extends through to outside surface 68 of cup wall 64 and the opposing orifice 72 does not extend to outside surface 68 of cup wall 64. Alternatively, orifices 72 both extend through cup walls 64.

Cup 62 is secured in portal 50 by engagement of ridges 70 with the slots 54. It will be readily understood by a person of ordinary skill in the art that engaging ridges 70 with slots 54 may be proved in reverse location as between cup 62 and portal 50 without departing from the function, way, result, or spirit of the present disclosure.

In a variation of this embodiment that is applicable to the certain other embodiments, axle 82 is formed on roller 80. This variation is particularly useful in embodiments having inwardly tapered cup walls 64, such as are shown, for example, in FIGS. 3, 4, 6, and 10.

Figure 4:
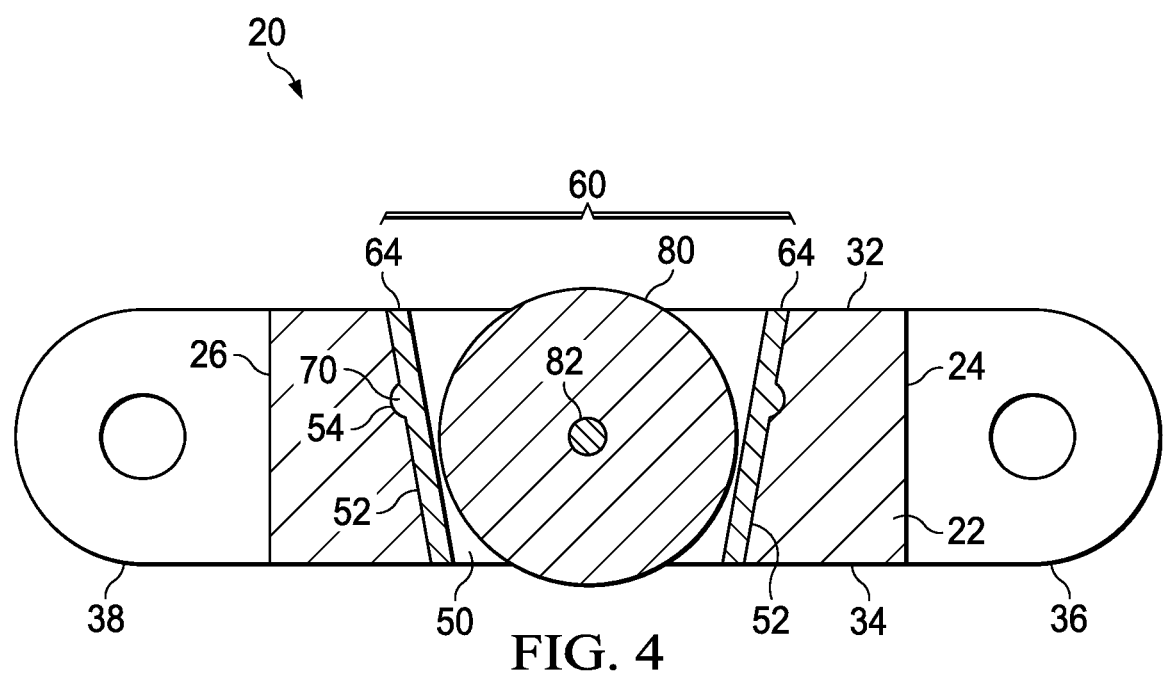
FIG. 4 is a side-sectional view of a conveyor module in accordance with the first embodiment of the invention, viewed from an end of the module, and illustrating the cup and roller assembly installed in the portal of the module in the orientation illustrated in FIG. 2.

FIG. 4 is an end-sectional view of a conveyor module 20 in accordance with the first embodiment of the invention, viewed from first end 28 of module 20, and illustrating cup and roller assembly 60 installed in portal 50 of module 20 in the same orientation illustrated in FIGS. 1 and 2. In the embodiment illustrated in FIG. 4, portal surfaces 52 are tapered such that portal 50 forms an opening having a truncated pyramid shape. Likewise, cup walls 64 of cup 62 have the form of a truncated pyramid such that cup 62 is received into portal 50 in close complementary fit. Ridges 70 of cup walls 64 engage with slots 54 of portal 50 to secure cup and roller assembly 60 in portal 50 of module 20. Ridges 70 may be radial or any other shape that engages slots 54 to secure cup and roller assembly 60 in portal 50 of module 20.

As also illustrated in this embodiment, roller 80 of cup and roller assembly 60 extends above top surface 32 of planar member 22, and below bottom surface 34 of planar member 22. The clearance between roller 80 and cup walls 64 at top surface 32 is significantly larger than the clearance between roller 80 and cup walls 64 at bottom surface 34. This embodiment and other embodiments with these features allow conveyed material leaks and conveyor cleaning fluids to funnel downwards into and through cup and roller assembly 60 to keep top surface 32 of module 20 dryer. This embodiment provides the further advantage of easy and properly aligned installation of cup and roller assembly 60 into portal 50 of module 20 and discourages cup 62 to module 20 disassembly.

Figure 5:
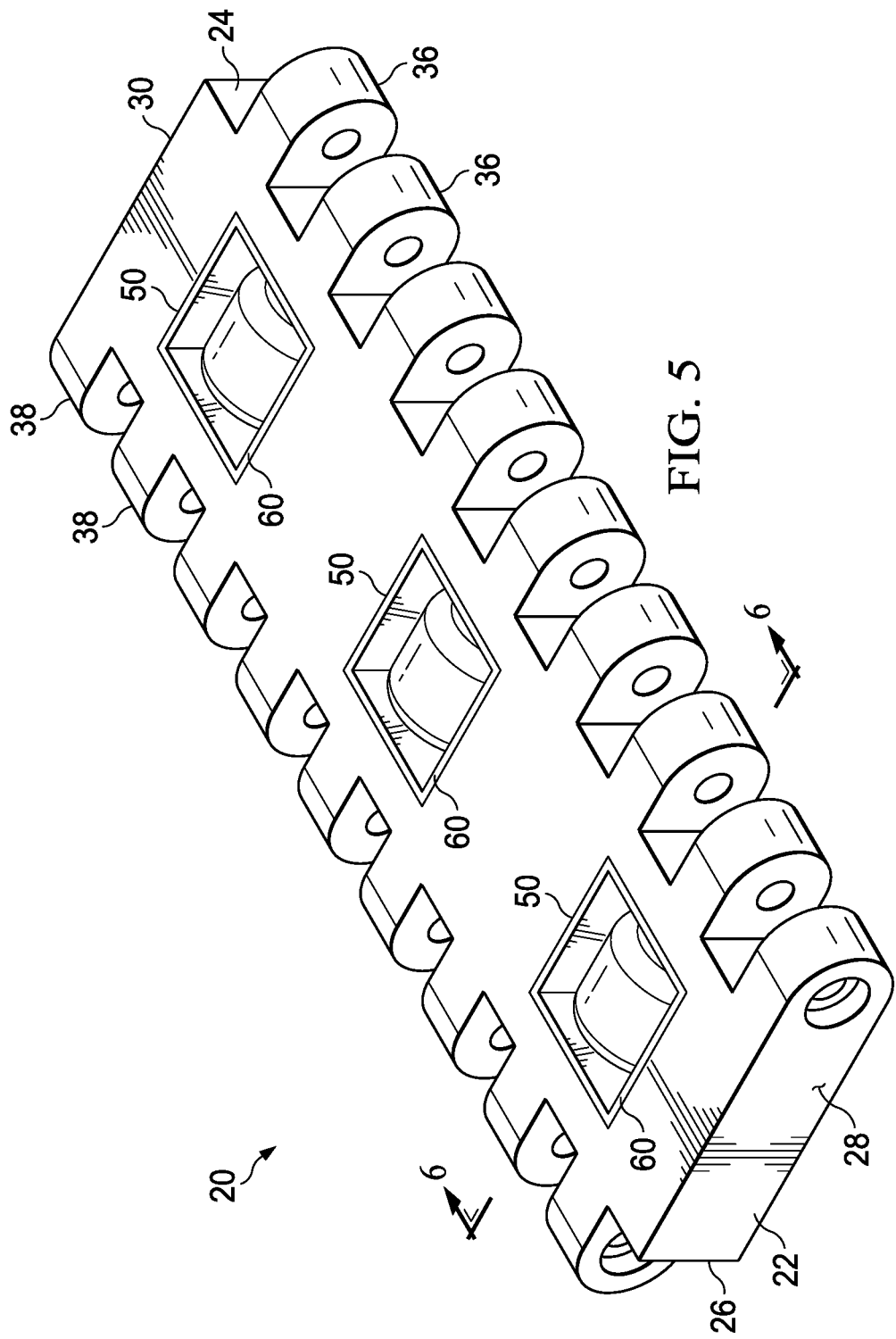
FIG. 5 is an isometric top view of a single conveyor module of the embodiment of FIG. 1, illustrating the module having cup and roller assemblies installed in a position 90 degrees to the position illustrated in FIG. 2.

FIG. 5 is an isometric top view of a single conveyor module of the embodiment of FIG. 1, illustrating the module having cup and roller assemblies installed in a position 90 degrees to the position illustrated in FIG. 2.

Figure 6:
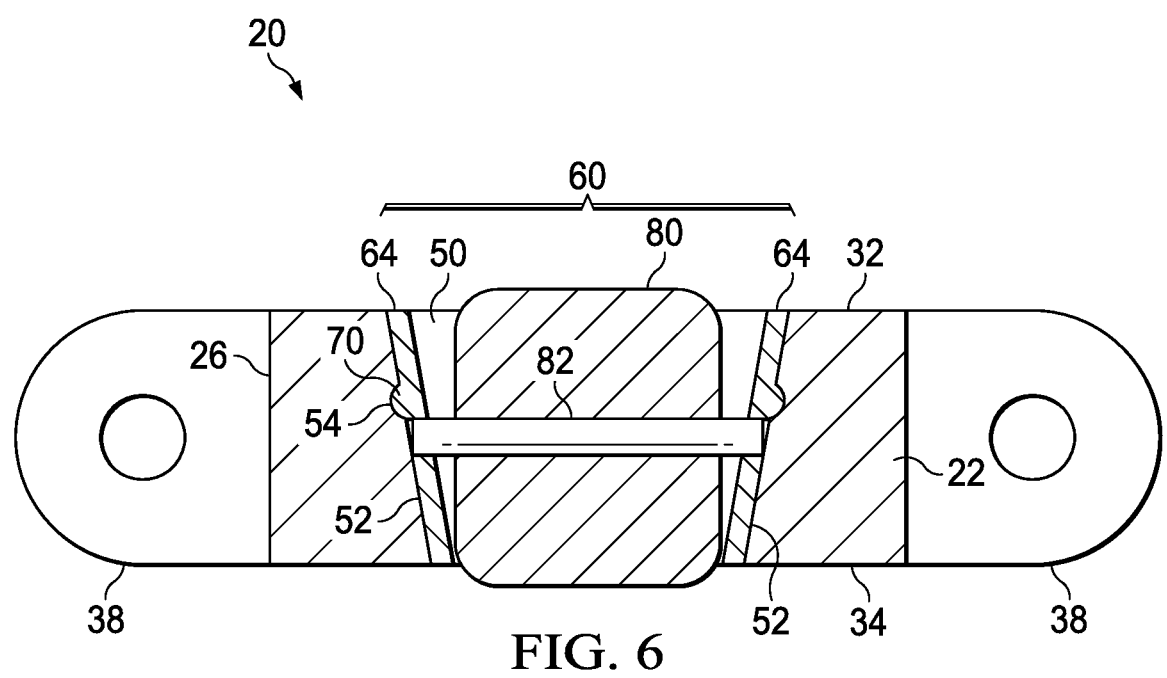
FIG. 6 is an end-sectional view of the conveyor module in accordance with the first embodiment of the invention, viewed from the first end of the module, and illustrating the cup and roller assembly installed in the portal of the module in the orientation illustrated in FIG. 5.

FIG. 6 is a side-sectional view of the conveyor module of FIG. 5, viewed from an end of the module, and illustrating the cup and roller assembly installed in the portal of the module in the orientation illustrated in FIG. 5.

Figure 7:
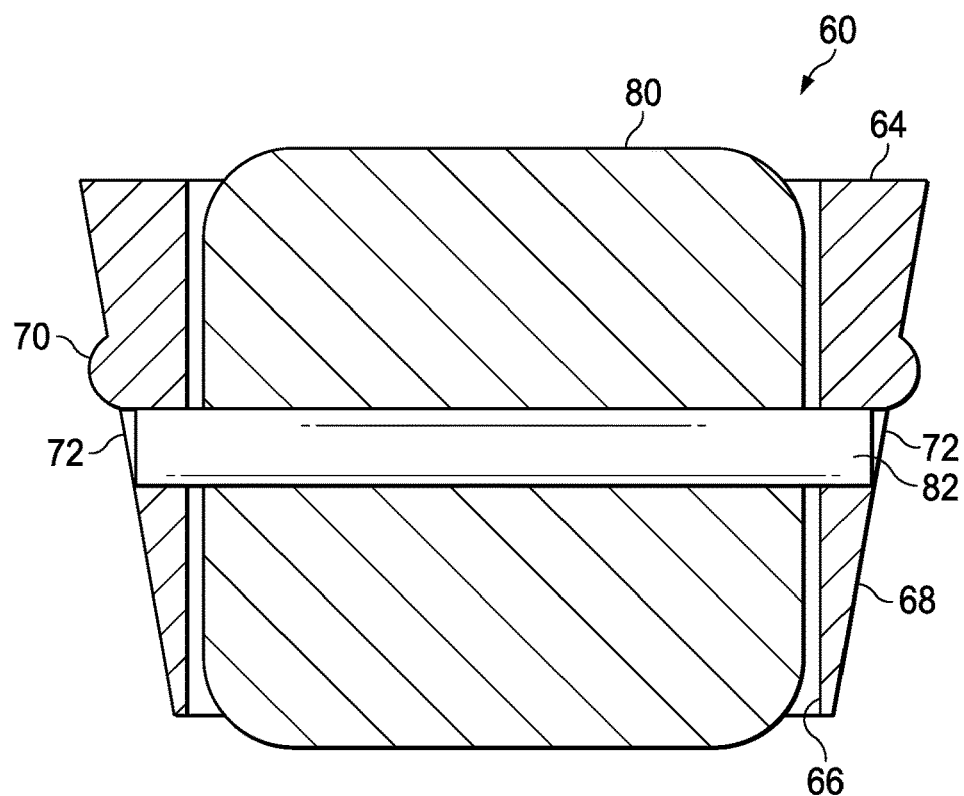
FIG. 7 is a side-sectional view of the assembled cup, roller, and axle in accordance with a second embodiment of the invention.
Figure 8:
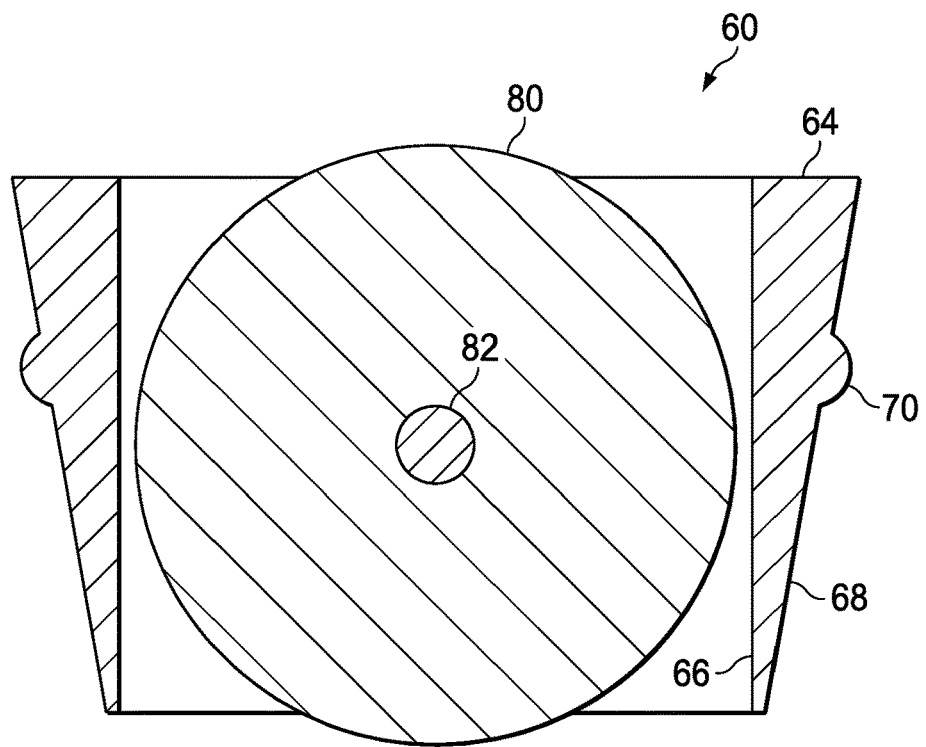
FIG. 8 is an end-sectional view of the assembled cup, roller, and axle of FIG. 7.

FIGS. 7 and 8 illustrate a second embodiment of the invention. FIG. 7 is a side-sectional view of the assembled cup, roller, and axle in accordance with a second embodiment of the invention. FIG. 8 is an end-sectional view of the assembled cup, roller, and axle of FIG. 7. As FIGS. 7 and 8 may be compared to FIGS. 4 and 6 of the first embodiment, it is seen in FIGS. 7 and 8 that interior surfaces 66 of cup walls 64 are substantially vertical, such that interior surfaces 66 of cup 62 form a substantially cubic opening.

As also illustrated in this embodiment, roller 80 of cup and roller assembly 60 extends above top surface 32 of planar member 22, and below bottom surface 34 of planar member 22. This embodiment prevents material drawdown into cup and roller assembly 60 and provides the further advantage of easy and properly aligned installation of cup and roller assembly 60 into portal 50 of module 20.

Figure 9:
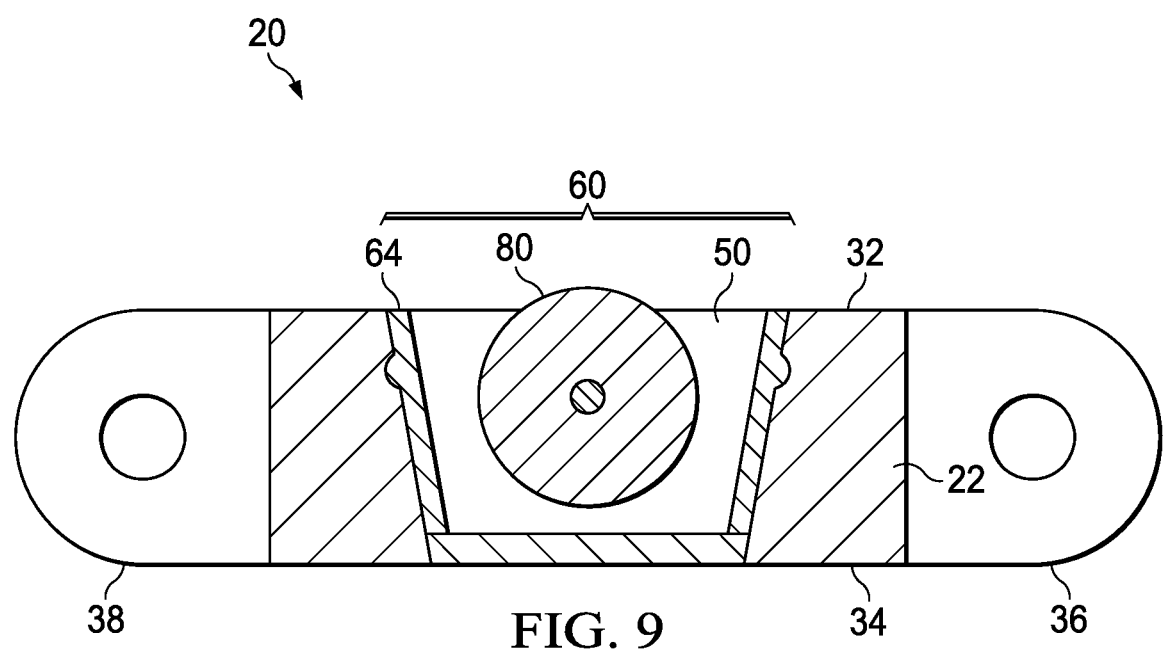
FIG. 9 is side-sectional view of a conveyor module in accordance with a third embodiment of the invention, viewed from an end of the module, in which the cup and roller assembly does not extend through the bottom surface of the module.
Figure 10:
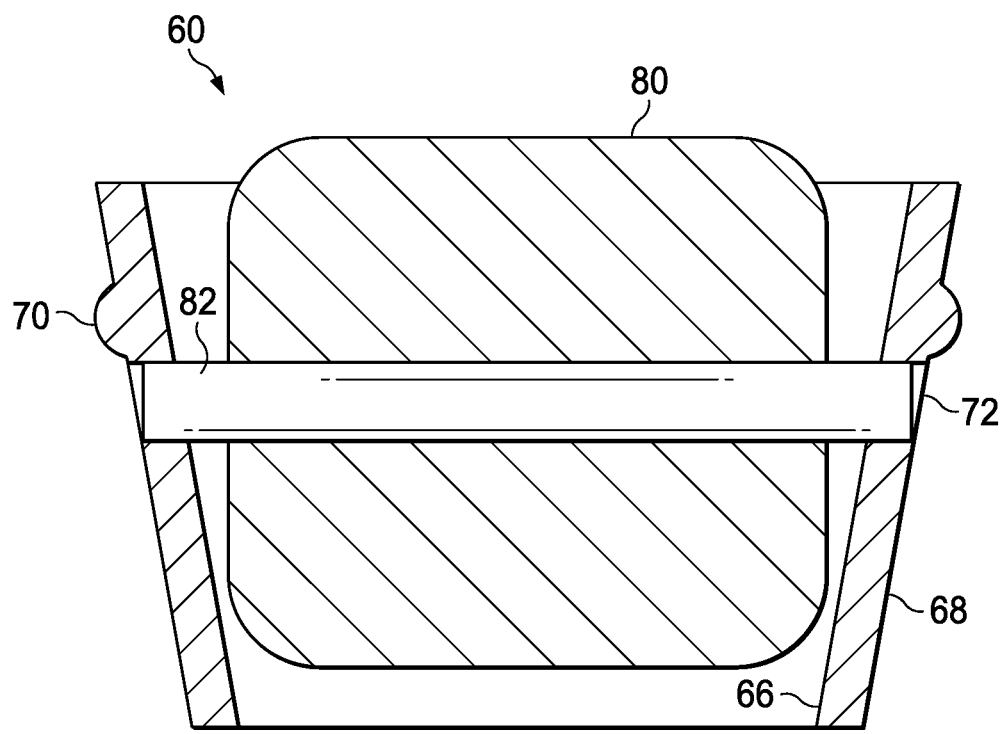
FIG. 10 is a side-sectional view of the assembled cup, roller, and axle in accordance with the third embodiment from FIG. 9.
Figure 11:
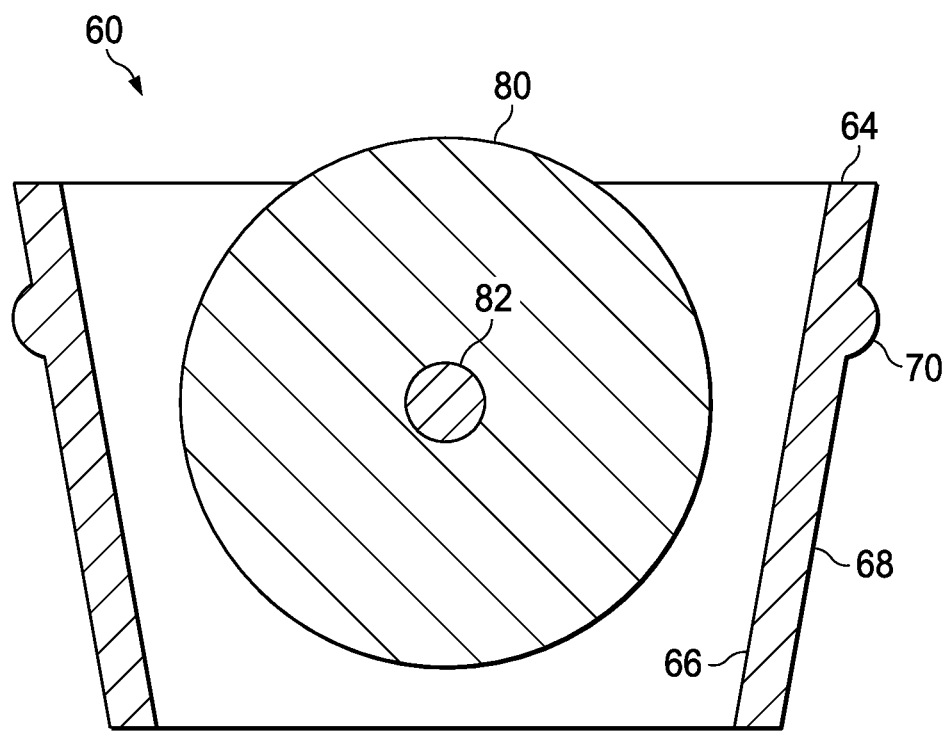
FIG. 11 is an end-sectional view of the assembled cup, roller, and axle of FIG. 10.

FIGS. 9-11 illustrate a third embodiment of the invention. FIG. 9 is a side-sectional view of conveyor module 20 in accordance with the third embodiment of the invention, viewed from first end 28 of module 20. In this third embodiment, portal 50 extends through bottom surface 34 of module 20 as in the other embodiments.

FIG. 10 is a side-sectional view of cup and roller assembly 60 in accordance with the third embodiment of FIG. 9. FIG. 11 is an end-sectional view of cup and roller assembly 60 in accordance with the third embodiment of FIGS. 9 and 10.

As FIGS. 10 and 11 may be compared to FIGS. 4 and 6 of the first embodiment, it is seen in FIGS. 10 and 11 that interior surfaces 66 of cup walls 64 are substantially vertical, such that interior surfaces 66 of cup 62 form a substantially cubic opening. In this embodiment, roller 80 extends above top surface 32, but does not extend beyond bottom surface 34 of module 20. This embodiment provides the advantage that it allows for box accumulation. If roller 80 extended below bottom surface 34 of module 20, and it came into contact with the support frame of module 20 during a box accumulation event, roller 80 would rotate. A further advantage is that certain applications perform best with the roller not rotating. A further advantage is that the builder of conveyor system 10 need not worry about the location of conveyor supports or of a solid conveyor bed.

Figure 13:
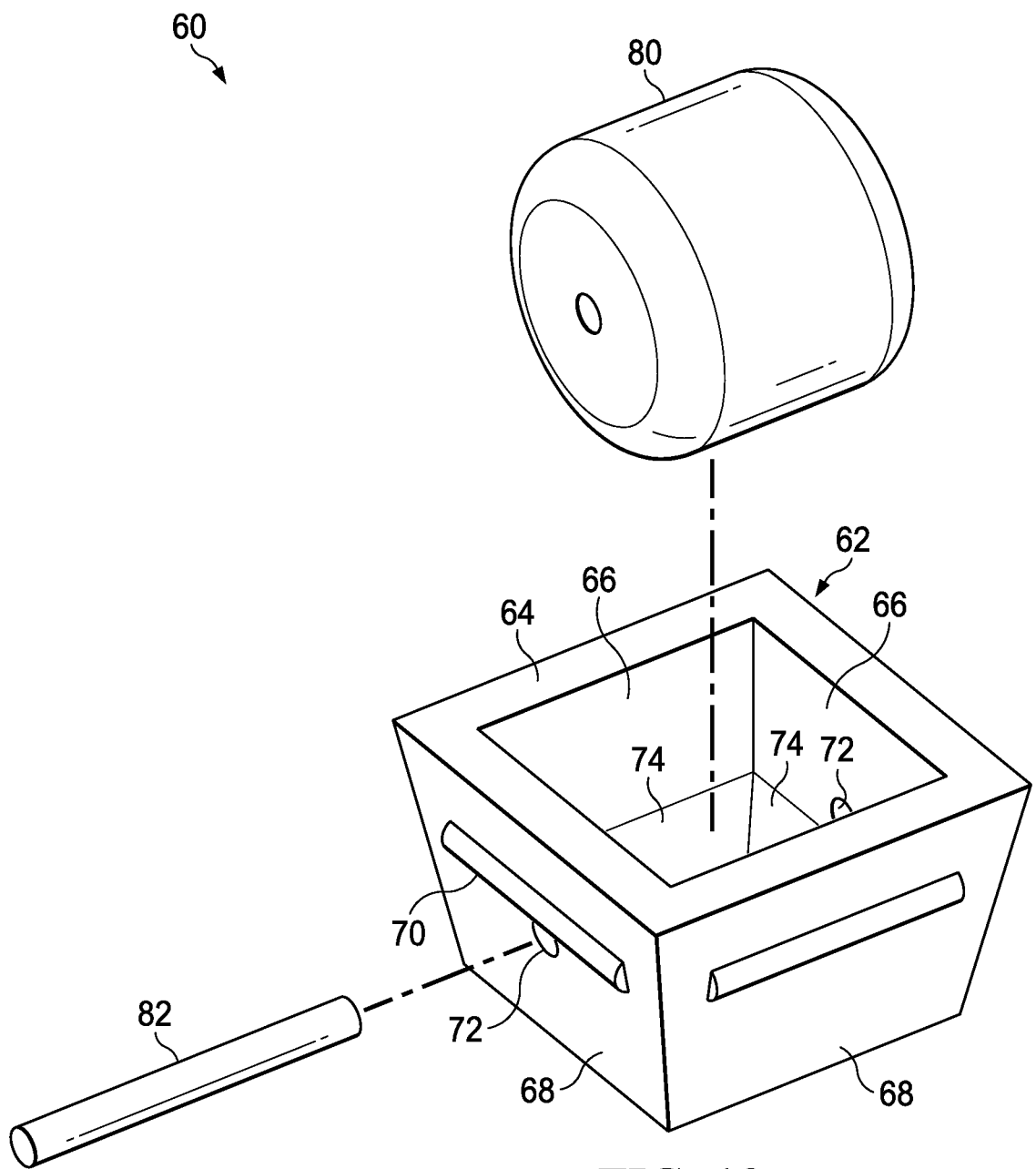
FIG. 13 is an isometric exploded view of a cup, roller, and axle assembly in accordance with the embodiment of FIG. 12.
Figure 14:
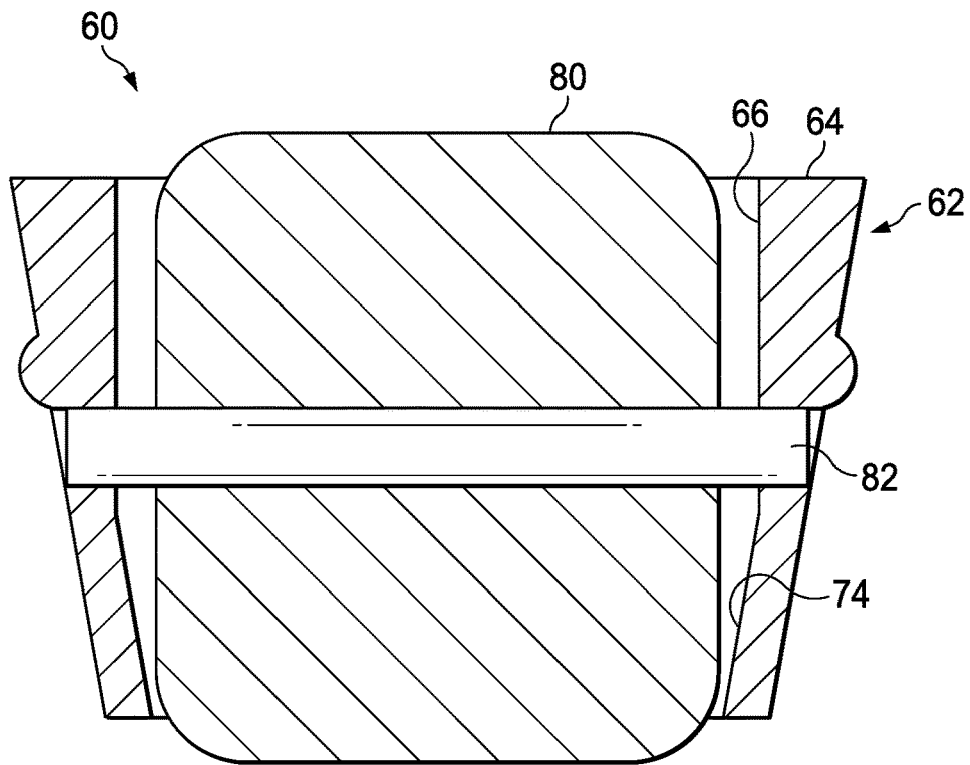
FIG. 14 is a side-sectional view of the assembled cup, roller, and axle in accordance with FIG. 13.
Figure 15:
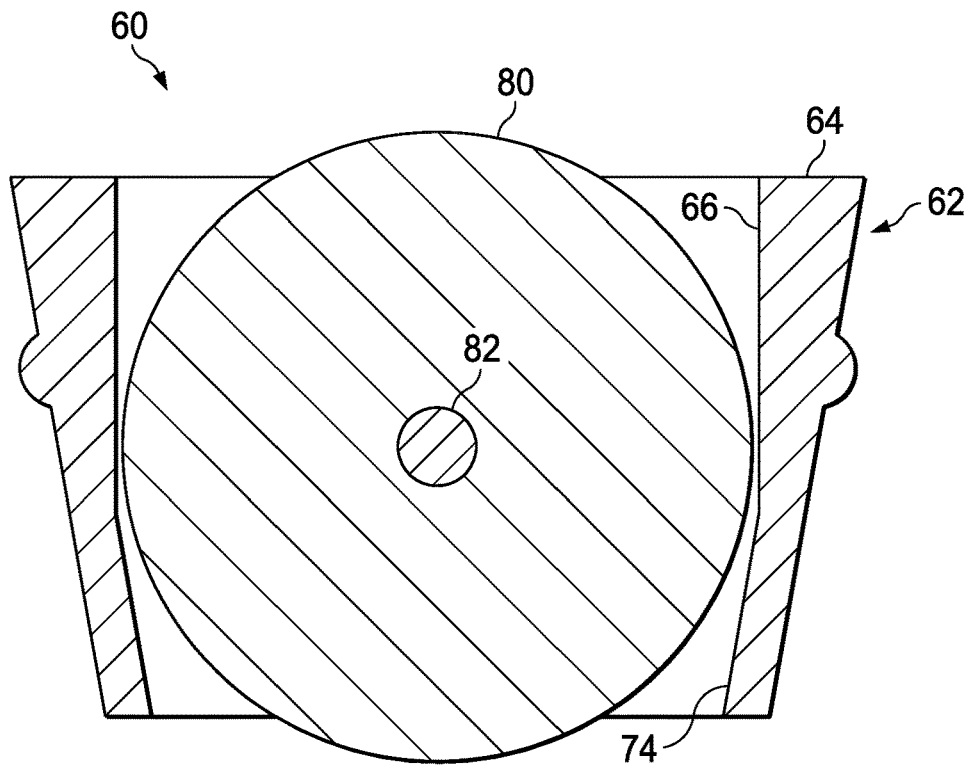
FIG. 15 is an end-sectional view of the assembled cup, roller, and axle of FIG. 14.

FIGS. 12-15 illustrate a fourth embodiment of the invention. FIG. 12 is a top view of conveyor system 10 having multiple modules 20 connected together. FIG. 13 is an isometric exploded view of cup and roller assembly 60 in accordance with the embodiment of FIG. 12. FIGS. 14 and 15 are side-sectional and end-sectional views, respectively, of cup and roller assembly 60.

As seen in FIGS. 13-15, a tapered surface 74 is provided beneath inside surface 66 of cup wall 64. Tapered surface 74 is provided on at least two opposing cup walls 64. As shown in FIGS. 13-15, tapered surface 74 is provided on each of four cup walls 64. Tapered surface 74 creates a restriction about roller 80. The clearance between roller 80 and the top of cup walls 64 is significantly larger than the clearance between roller 80 and cup walls 64 at the bottom of cup walls 64. This embodiment provides the advantage of a smaller clearance between roller 80 and the top of cup walls 64 than the clearance obtainable in the first embodiment, as illustrated in FIGS. 1-6, while still permitting assembly of roller 80 into cup 62 from the top.

Figure 16:
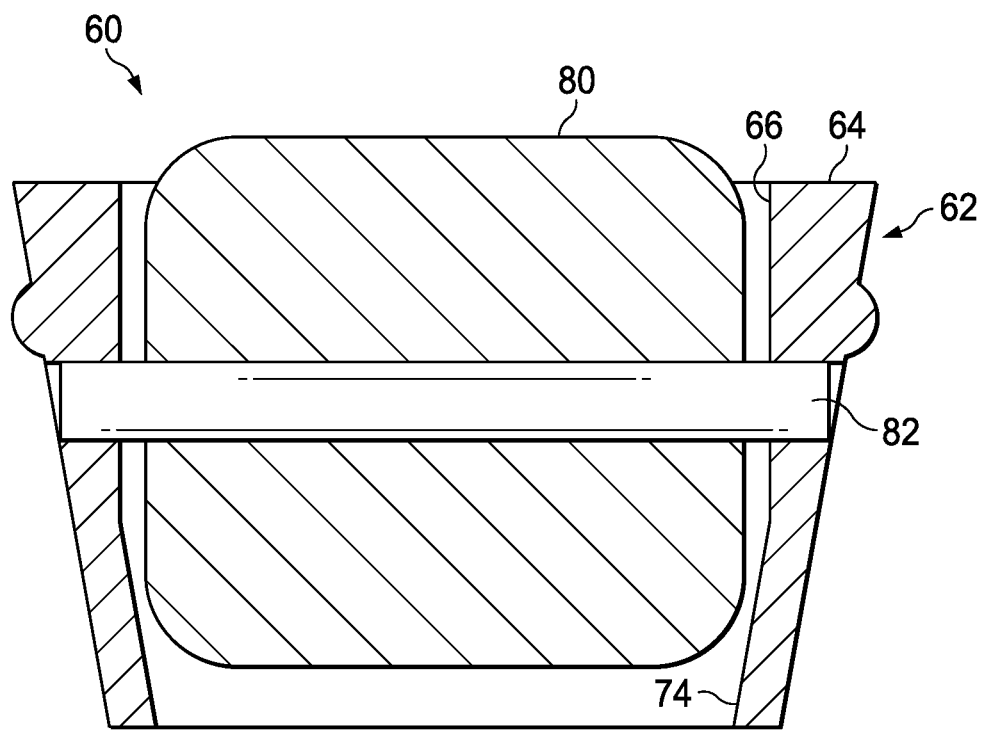
FIG. 16 is a side-sectional view of the assembled cup, roller, and axle in accordance with a fifth embodiment of the invention.
Figure 17:
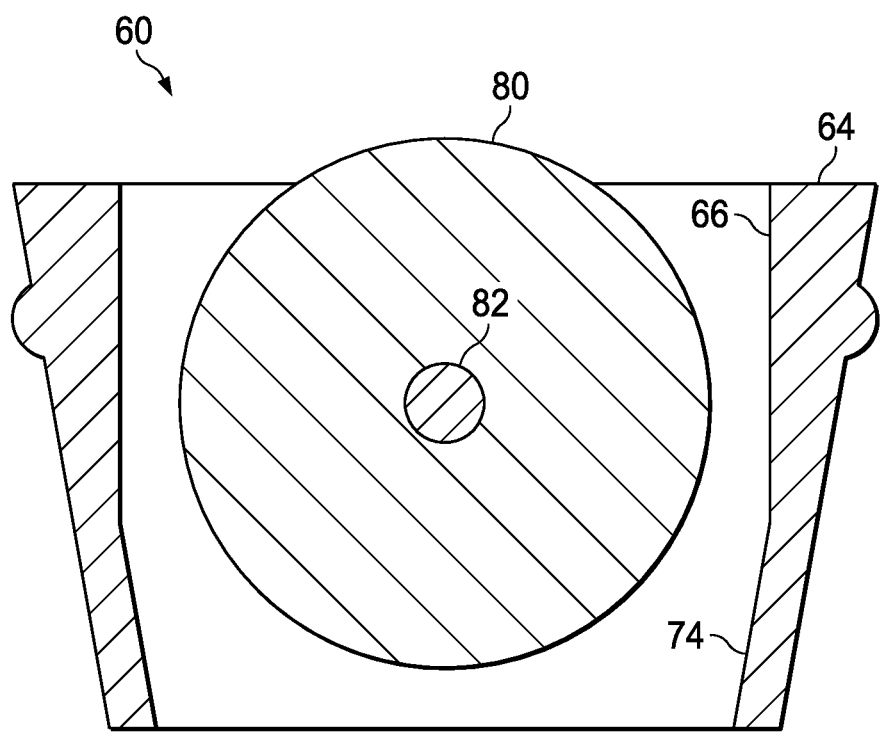
FIG. 17 is an end-sectional view of the assembled cup, roller, and axle of FIG. 16.

FIGS. 16-17 illustrate a fifth embodiment of the invention. FIGS. 16 and 17 are side-sectional and end-sectional views, respectively, of cup and roller assembly 60. This embodiment includes the use of the tapered surface 74 to create a restriction about roller 80. Additionally, in this embodiment, portal 50 does not extend through bottom surface 34 of module 20. When installed in module 20 (not shown), roller 80 extends above top surface 32 of module 20, but does not extend beyond the bottom of cup walls 64. This embodiment provides the combined advantages of the third and fourth embodiments for use in appropriate applications.

Figure 19:
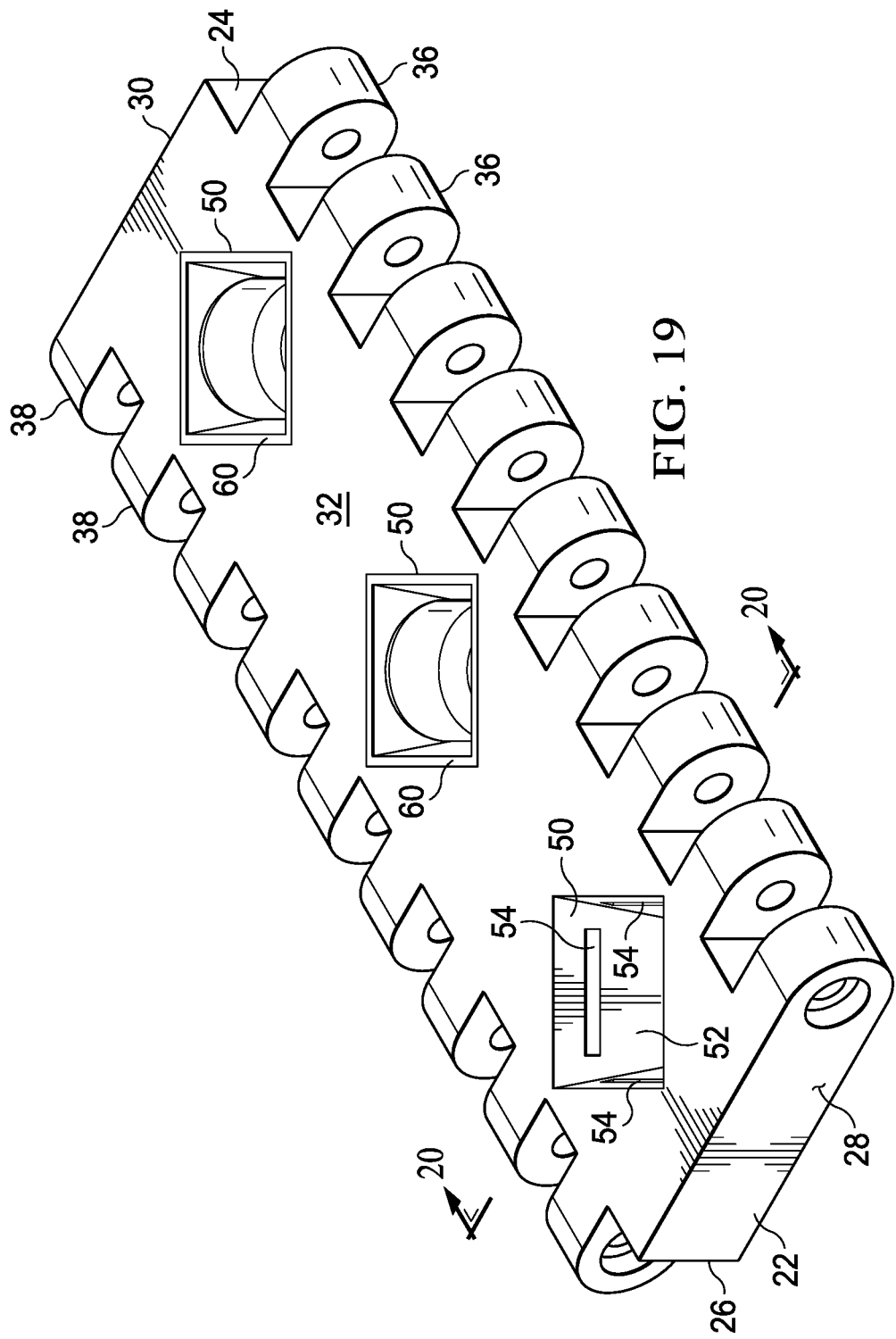
FIG. 19 is an isometric top view of a single conveyor module of the embodiment of FIG. 18, illustrating the module having an empty portal.
Figure 20:
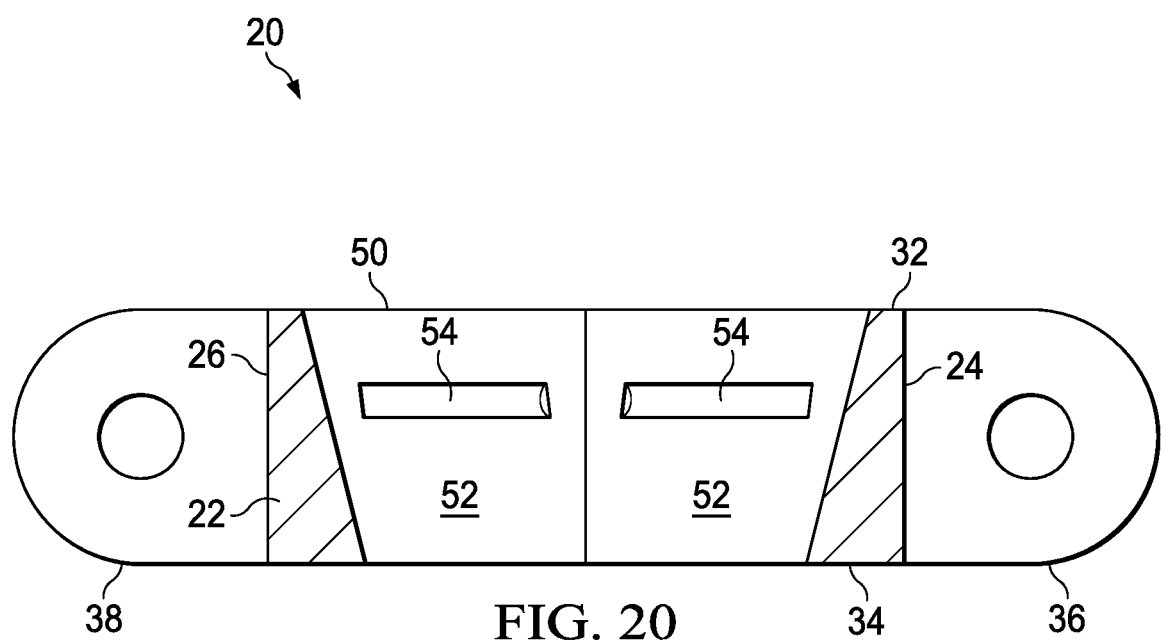
FIG. 20 is side-sectional view of the conveyor module in accordance with the sixth embodiment of the invention, viewed from an end of the module, and illustrating without a cup and roller assembly installed in the portal of the module.

FIGS. 18-20 illustrate a sixth embodiment of the invention. FIG. 18 is a top view of conveyor system 10 having multiple modules 20 connected together. FIG. 19 is an isometric top view of a single conveyor module 20 of conveyor system 10. In this view, cup and roller assemblies 60 are shown located in two of the three portals 50 of module 20.

As seen in FIG. 19, and as compared to module 20 in FIG. 2, portals 50, and thus cup and roller assemblies 60, are positioned at an angle to first side 24. In the embodiment illustrated in FIG. 19, portals 50 are rotated at an angle of about 45 degrees to front side 24. Cup and roller assemblies 60 may be rotated 90 degrees to obtain a second roller 80 direction. Portals 50 may receive cup and roller assemblies 60 from any of the five embodiments disclosed above. This embodiment provides the advantage of providing two roller 80 orientations of being configurable with multiple cup and roller assemblies 60.

FIG. 20 is an end-sectional view of module 20 in accordance with the sixth embodiment of the invention, viewed from first end 28 of module 20, and illustrated without cup and roller assembly 60 installed in portal 50 through which the section view is taken. Optional to this embodiment, portals 50 need not extend through bottom surface 34 of planar member 22. In that configuration, portals 50 can receive cup and roller assemblies 60 of embodiments 3 and 5 as described above and illustrated in FIGS. 10-11 and 16-17.

Figure 21:
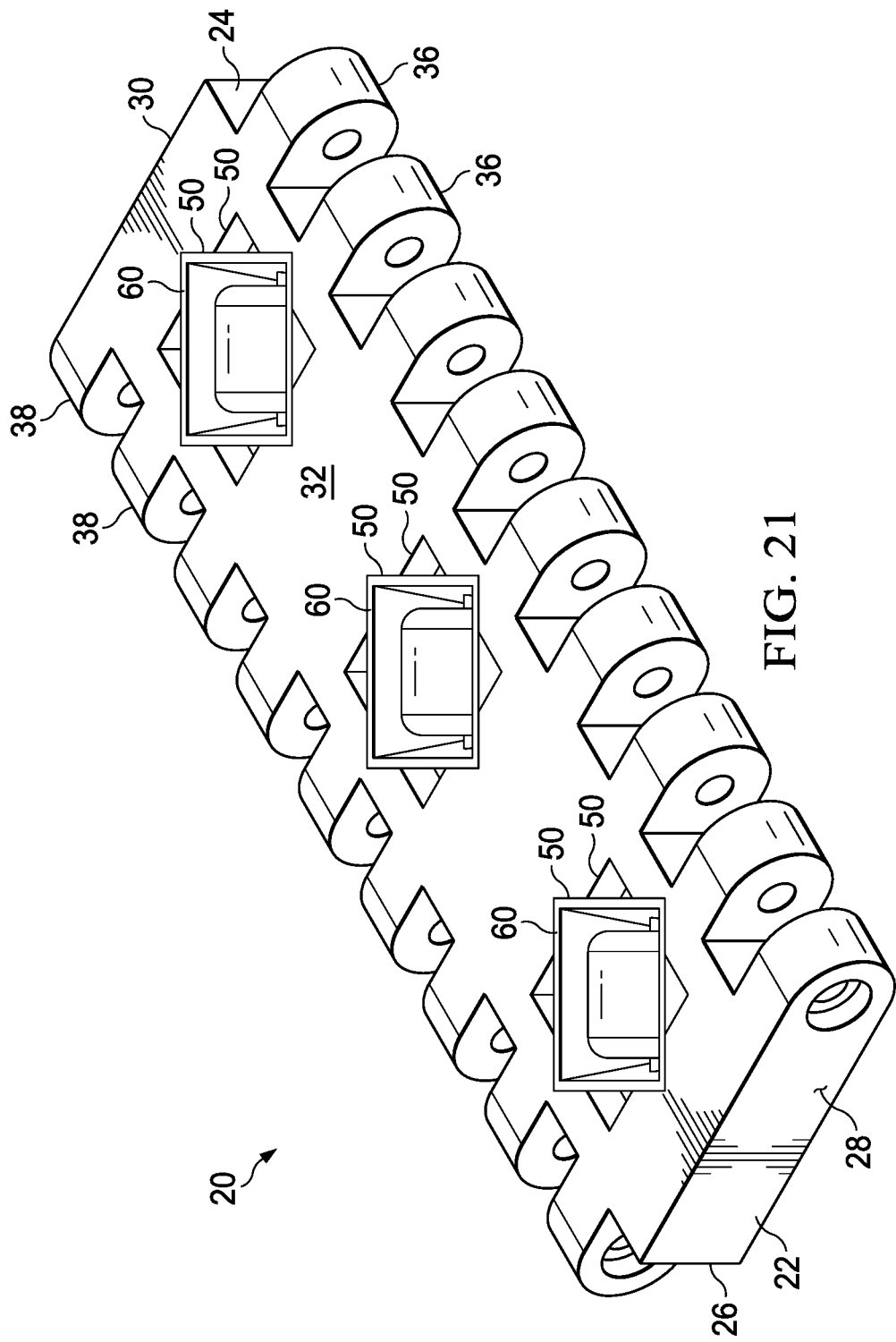
FIG. 21 is an isometric top view of a single conveyor module of a seventh embodiment of the invention.

FIG. 21 is an isometric top view of module 20 of conveyor system 10 of a seventh embodiment of the invention. In this view, portals 50 are positioned at an angle to first side 24. Portals 50 are provided for receiving cup and roller assemblies 60 in any one of four orientations of roller 80 in relation to first side 24.

In the first orientation illustrated, rollers 80 will roll in a direction angled at about 45 degrees to front side 24. By rotating cup and roller assemblies 60 clockwise 45 degrees from the position shown, rollers 80 will roll in a direction perpendicular to first end 28 and second end 30. By rotating cup and roller assemblies 60 clockwise by 90 degrees from the position shown, rollers 80 will roll in a direction angled at about 135 degrees to front side 24. By rotating cup and roller assemblies 60 clockwise by 135 degrees from the position shown, rollers 80 will roll in a direction perpendicular to first side 24 and second side 26.

Portals 50 may receive cup and roller assemblies 60 from any of the five embodiments disclosed above. Also optional to this embodiment, portals 50 need not extend through bottom surface 34 of planar member 22. In that configuration, portals 50 can receive cup and roller assemblies 60 of embodiments 3 and 5 as described above and illustrated in FIGS. 10-11 and 16-17.

This embodiment provides the advantage of providing four unique roller 80 orientations from a single module 20 configuration. This embodiment provides the further advantage of being configurable with multiple cup and roller assemblies 60.

Figure 22:
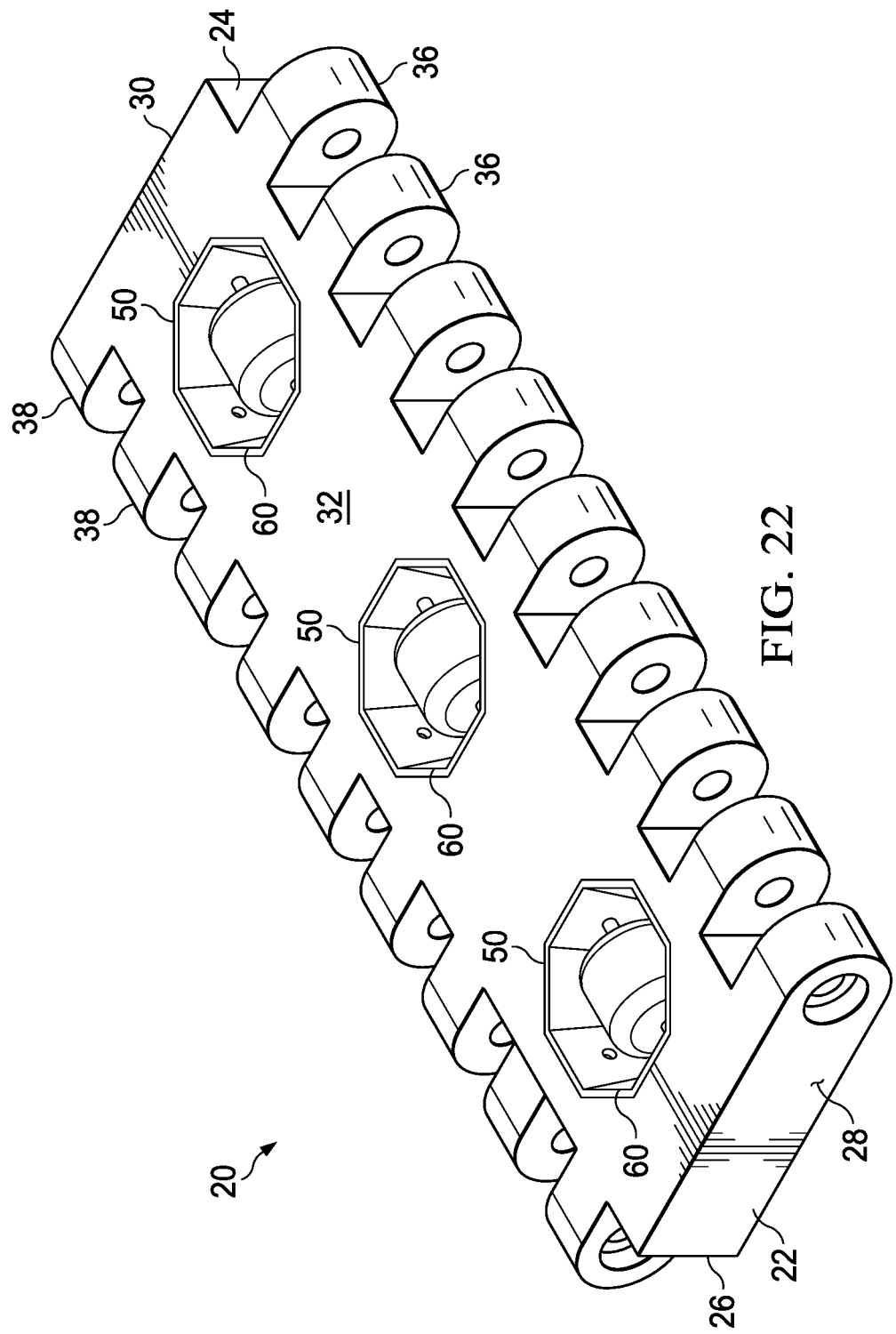
FIG. 22 is an isometric top view of a single conveyor module of an eighth embodiment of the invention.
Figure 23:
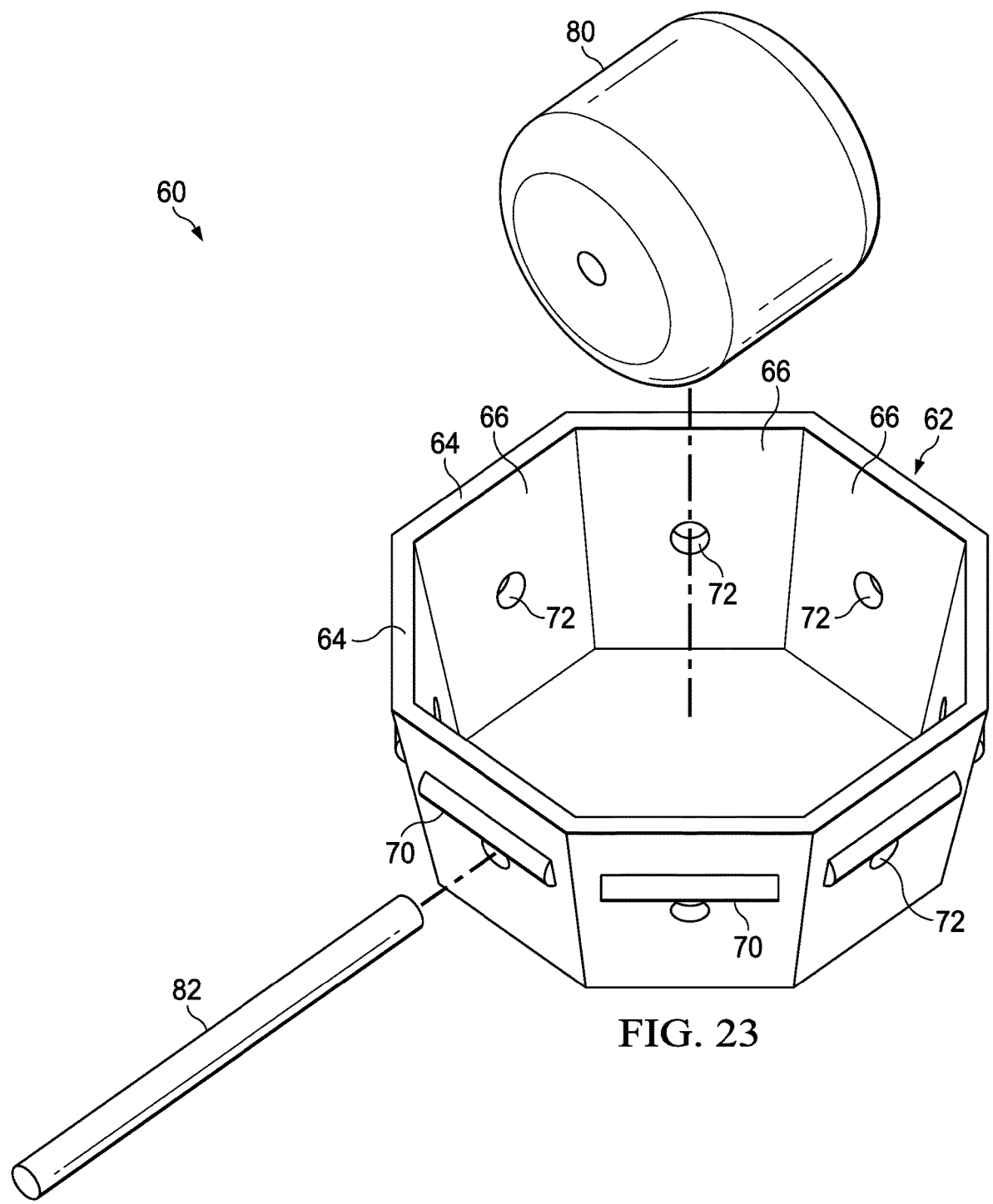
FIG. 23 is an isometric exploded view of the cup, roller, and axle assembly in accordance with the embodiment of FIG. 22.

FIGS. 22-23 illustrate an eighth embodiment of the invention. FIG. 22 is an isometric top view of a single conveyor module 20, having octagonal shaped portals 50 and octagonal shaped cups 62. As with the embodiments illustrated, rollers 80 may extend above top surface 32 of planar member 22 only, or rollers 80 may extend above top surface 32 and below bottom surface 34 of planar member 22.

Octagonal cup and roller assemblies 60 are rotatably positional in octagonal portals 50 to provide four unique roller 80 directions.

FIG. 23 is an isometric exploded view of cup and roller assembly 60 in accordance with the embodiment of FIG. 22. FIG. 23 illustrates how roller 80 and axle 82 may be selectively positioned to obtain four unique roller 80 directions without rotating cup 62 in relation to portal 50.

This embodiment provides the advantage of providing four unique roller 80 orientations from a single module 20 configuration. This embodiment provides the further advantage of being configurable with multiple cup and roller assemblies 60. This embodiment provides the further advantage of providing four unique roller 80 orientations within a cup 62. This is advantageous to avoid the need for part replacements when a bearing orifice 72 becomes worn.

In one embodiment that may be applied to any of the other embodiments, cup 62 is made of a material that is harder than that of module 20. In this embodiment, the top of cup walls 64 delay wear to top surface 32 to extend the useful life of module 20. Additionally, the dissimilarly in material strength permits use of cup 62 and axle 82 materials that cooperate to provide extended wear of cup and roller assembly 60. For example, cup 62 can be made of a higher wear resistant material than axle 82, which extends the life cup 62. Cup and roller assemblies 60 can be replaced and modules 20 reused.

In addition to the advantages of various embodiments described above, the invention is simple, safe, and durable. Another advantage of various embodiments of the invention is that it is inexpensive to manufacture. Another advantage of the various embodiments is that it provides for a simplified, easily deployable, and easily removable system. Other advantages of various embodiments of the invention are that it is easy to clean and provides improved tracking.

It will be readily apparent to those skilled in the art that the general principles defined herein may be applied to other embodiments and applications without departing from the spirit and scope of the present invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

I claim:

1. A conveyor module for a conveyor belt, comprising:
   a planar member, comprising;
      a first side, and an opposing second side;
      a first end, and an opposing second end;
      a top surface extending between the first and second sides and first and second ends; and,
      a bottom surface extending between the first and second sides and first and second ends, and being opposite to the top surface;
   a plurality of first links located along the first side;
   a plurality of second links located along the second side, wherein the second links are adapted to engage and register with the first links so as to form a pivot joint between adjacent conveyor modules;
   a plurality of portals, each portal extending through the top surface and the bottom surface of the planar member;
   the portal comprising four portal surfaces oriented in opposing pairs that extend from the top surface to the bottom surface of the planar member;
   a longitudinal slot located on each of two of the portal surfaces;
   a cup, comprising:
      four walls oriented in opposing pairs, each wall having an inside surface and an outside surface;
      a pair of longitudinal ridges formed on the outside surfaces of two walls;
      a pair of opposing bearing orifices formed on the inside surfaces of two opposing walls;
      a roller rotatably mounted on an axle; and,
      the axle extending between the bearing orifices to position the roller inside the cup;
   the cup secured in the portal by engagement of the longitudinal ridges with the slots; and,
   the walls of the cup extending from the top surface of the planer member to the bottom surface of the planer member.

2. The conveyor belt of claim 1, further comprising:
the slots disposed substantially parallel to the plane of the planar member.

3. The conveyor belt of claim 1, further comprising:
the portal walls being inwardly inclined; and
the cup walls being inwardly inclined.

4. The conveyor module of claim 1, further comprising:
the cup made of a material that is more wear resistant than the planar member.

5. The conveyor module of claim 1, further comprising:
the slots located on a pair of opposing portal surfaces.

6. The conveyor module of claim 1, further comprising:
the ridges located on a pair of opposing walls.

7. The conveyor module of claim 1, further comprising:
the slots and ridges having a semi-circular surface.

8. The conveyor module of claim 1, further comprising:
the cup wall having a tapered surface below the inside surface.

9. The conveyor module of claim 1, further comprising:
the roller extending above the top surface of the planar member.

10. The conveyor module of claim 1, further comprising:
the roller extending below the bottom surface of the planar member.

11. The conveyor module of claim 1, further comprising:
the cup and roller assembly being selectably positioned in the portal to present the roller at different angles of rotation in relation to the planar module.

12. The conveyor module of claim 1, further comprising:
the portal having the shape of an eight-pointed star.

13. The conveyor module of claim 1, further comprising:
the portal having the shape of an octagon.

* * * * *

UNITED STATES PATENT AND TRADEMARK OFFICE
CERTIFICATE OF CORRECTION

PATENT NO. : 10,773,896 B1
APPLICATION NO. : 16/443706
DATED : September 15, 2020
INVENTOR(S) : Chris Smith It is certified that error appears in the above-identified patent and that said Letters Patent is hereby corrected as shown below:

In the Claims

Column 10, Line 6: Claim 1: replace the word "planer" with -- planar --, both occurrences Signed and Sealed this
Third Day of August, 2021

Drew Hirshfeld
*Performing the Functions and Duties of the
Under Secretary of Commerce for Intellectual Property and
Director of the United States Patent and Trademark Office*